United States Patent [19]

Herrmann et al.

[11] Patent Number: 5,166,673
[45] Date of Patent: Nov. 24, 1992

[54] METHOD FOR CONTROLLING AND/OR MONITORING A COMMUNICATION TRANSMISSION EQUIPMENT FOR TRANSMISSION ERRORS FOR THE IMPLEMENTATION OF THE METHOD

[75] Inventors: Karl Herrmann, Eckental; Ferdinand Narjes, Munich; Erhard Steiner, Eichenau; Guenter Weimert, Munich, all of Fed. Rep. of Germany

[73] Assignees: U.S. Philips Corporation, New York, N.Y.; Siemens Aktiengesellschaft, Munich, Fed. Rep. of Germany

[21] Appl. No.: 566,390

[22] PCT Filed: Feb. 28, 1989

[86] PCT No.: PCT/DE89/00115
 § 371 Date: Oct. 22, 1990
 § 102(e) Date: Oct. 22, 1990

[87] PCT Pub. No.: WO89/08354
 PCT Pub. Date: Sep. 8, 1989

[30] Foreign Application Priority Data

Mar. 3, 1988 [DE] Fed. Rep. of Germany ....... 3806948
Mar. 3, 1988 [DE] Fed. Rep. of Germany ....... 3806949

[51] Int. Cl.⁵ .............................................. P04Q 9/00
[52] U.S. Cl. .......................... 340/825.06; 340/825.16
[58] Field of Search ............... 340/825.06, 825.07, 340/825.08, 825.15, 825.16; 371/11.1, 11.2, 20.6; 370/13, 16, 16.1, 13.1, 20.2, 29.5

[56] References Cited

U.S. PATENT DOCUMENTS

| | | | |
|---|---|---|---|
| 4,279,034 | 7/1981 | Baxter | 371/11.2 |
| 4,498,082 | 2/1985 | Aldridge et al. | 340/825.16 |
| 4,660,201 | 4/1987 | Nakamura | 340/825.16 |

FOREIGN PATENT DOCUMENTS

| | | |
|---|---|---|
| 54102/86 | 9/1986 | Australia . |
| 0193835A1 | 9/1986 | European Pat. Off. . |
| 3436414C2 | 4/1986 | Fed. Rep. of Germany . |
| 2289088 | 5/1976 | France . |

OTHER PUBLICATIONS

"Supervision & Additional Services For Digital Fiber-Optic Transmission Systems" Braun et al., telcom report 10 (1987) Special Multiplexing and Line Transmission, pp. 107–112.

Primary Examiner—Donald J. Yusko
Assistant Examiner—Edwin C. Holloway, III
Attorney, Agent, or Firm—Hill, Van Santen, Steadman & Simpson

[57] ABSTRACT

In a method for controlling and/or monitoring wherein a polling unit (7, 8) exchanges information with processor units (6) in a callin mode, the processor units (6) can be switched from a first to a second transmission mode. In the first transmission mode, the telegrams are through-connected without intermediate storage; in the second transmission mode, they are through-connected only given freedom from error. The method can be advantageously employed in equipment for in-service monitoring of equipment of communication transmission technology.

6 Claims, 5 Drawing Sheets

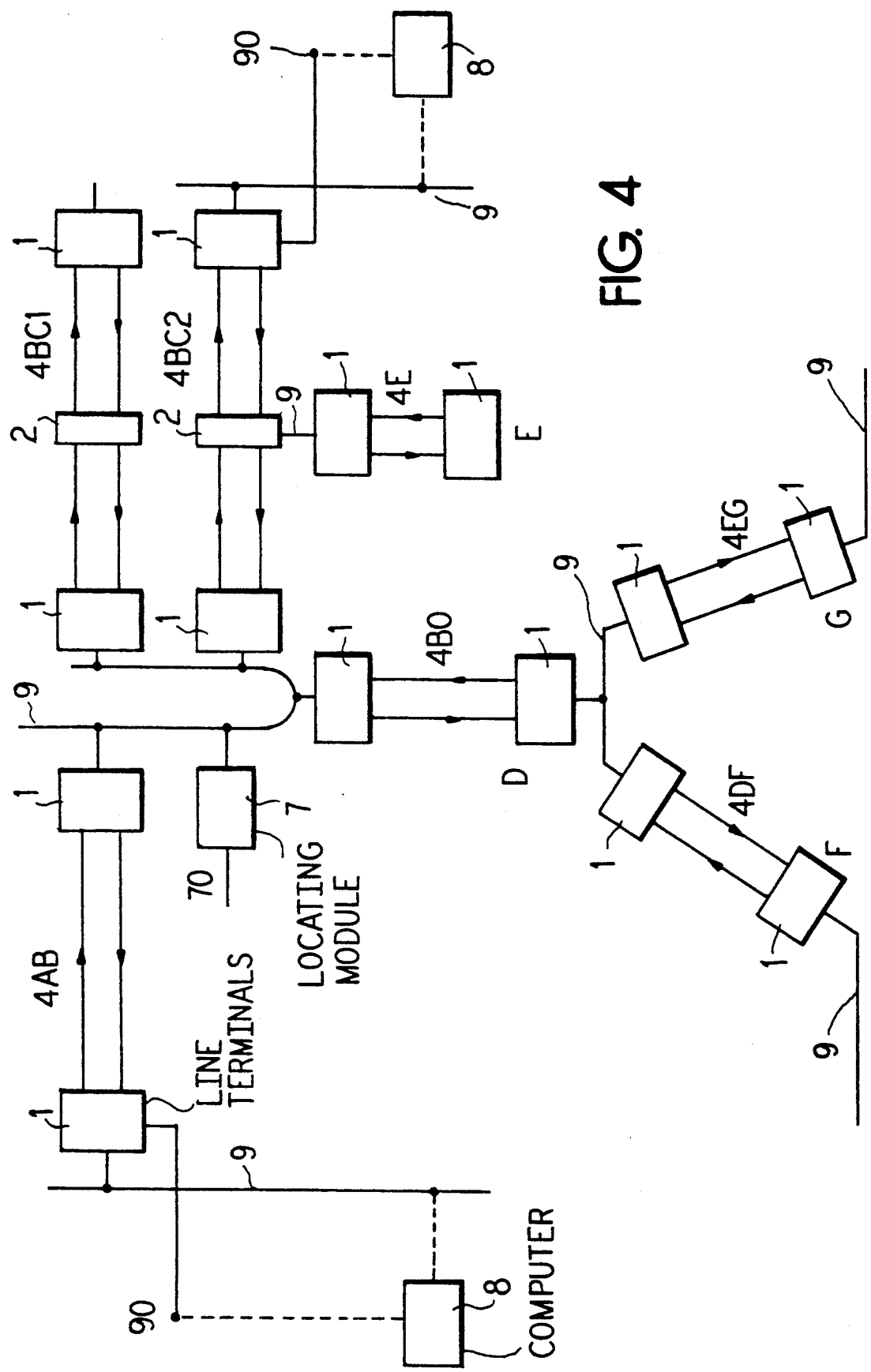

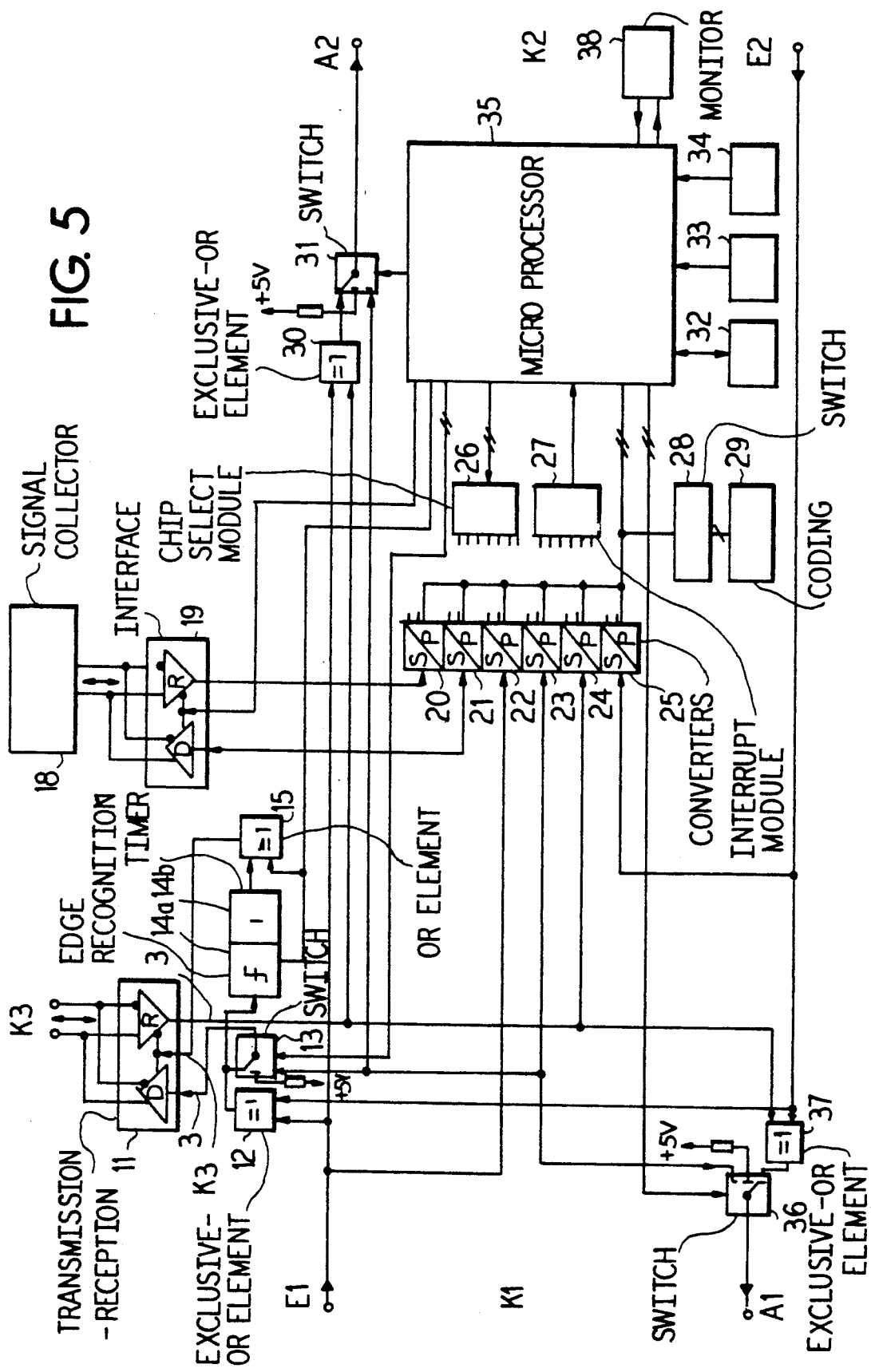

METHOD FOR CONTROLLING AND/OR MONITORING A COMMUNICATION TRANSMISSION EQUIPMENT FOR TRANSMISSION ERRORS FOR THE IMPLEMENTATION OF THE METHOD

BACKGROUND OF THE INVENTION

The invention is directed to a method for controlling and/or monitoring whereby at lest one monitoring unit exchanges information with processor units that are connected to the monitoring unit via a common telegram transmission network and are provided with addresses and whereby polling telegrams of the monitoring unit and reply telegrams of the processor units are transmitted.

Such a method is already disclosed by German Published Application 34 36 414. In the known method, the addresses are set with the assistance of coding switches.

A method for in-service monitoring of a communication transmission equipment wherein useful signals are transmitted via an electrooptical transmission link and telemetry signals are transmitted via an auxiliary channel is already known from Ewald Braun and Erhard Steiner: "Supervision and Additional Services for Digital Fiber-Optic Transmission Systems" telcom report 10 (1987) Special "Multiplexing and Line Transmission", pages 107 through 112.

The known method uses address-free telemetry telegrams, so that the processor units provided in the line terminal equipment and intermediate repeaters of a transmission section need not be addressed. The method, however, can not be employed without further ado in communication transmission equipment that have a star or, respectively, tree structure. When processor units that are called under address control by a locating unit in cyclical succession are provided in the appertaining telemetry means in a communication transmission network having star or, respectively, tree structure, then a structure corresponding to the useful signal network can also be provided for the telegram transmission network of the telemetry means.

This is also true of equipment for distributing electrical energy or the like that are to be monitored with the assistance of a remote control means.

SUMMARY OF THE INVENTION

It is an object of the invention to specify a method and a circuit arrangement for the implementation of the method that allow disadvantageous effects of disturbances in the telegram transmission network to be kept as small as possible. In particular, it should thereby be possible to localize the location of, in particular, brief-duration disturbances. The method and the circuit arrangement should be preferably suitable for an especially reliable in-service monitoring of communication, preferably digital signal transmission links.

For achieving this object, the method of the invention provides the method steps as follows: for at least one part of the processor units, telegrams of at least one transmission direction are conducted via a transmission unit that through-connects the telegrams without intermediate storage in a first transmission mode and, in a second transmission mode, forwards the telegram after intermediate storage and checking only when it is found that given demands are satisfied; and a respective switch from the first to the second transmission mode is undertaken as soon as the check in the appertaining processor unit finds that a through-connected telegram does not satisfy the given demands.

The method of the invention allows a repeated forwarding of disturbed telegrams to be prevented without the cycle time during normal operation being lengthened.

Advantageous developments of the method as well as expedient circuit arrangements for the implementation of the method are as follows:

The switching of the processor units form the second into the first transmission mod is respectively initiated by a control instruction of the monitoring unit. The processor units that have switched into the second transmission mode report the new mode in the reply telegram following the switching and report the appertaining transmission direction to the monitoring unit.

The monitoring unit, following a message that a processor unit has switched into the second transmission mode, cyclically calls the processor units beginning with the processor unit that lies closest to the monitoring unit and thereby respectively switches the processor unit and thereby respectively switches the processor units that are in the second transmission mode form the second transmission mode into the first transmission mode. The monitoring unit, as an error locating means and/or in-service monitoring means, exchanges information with processor units that are allocated to local ends or intermediate locations of a communication transmission equipment.

A circuit arrangement for controlling and/or monitoring, comprising at least one monitoring unit and comprising processor units that are connected to the monitoring unit via a common telegram transmission network and provided with addresses, whereby the monitoring unit comprises a means for transmitting polling telegrams and the processor units each respectively comprise a means for transmitting reply telegrams, has the following components: for at least one transmission direction, at least one part of the processor units respectively contains transmission equipment having a switch-over means and contains an evaluation means provided with an intermediate memory for evaluating received telegrams; and the switchover mean.- is respectively controllable by the evaluation means such that the output of the switch-over means is connected via the switch-over means to the input of the transmission unit in a first transmission mode and is connected to an output of the intermediate memory in a second transmission mode. The control input of the switch-over means is connected to a control output of the evaluation means that, when it is found that the prescribed demands are not satisfied, outputs a first controls signal of the second transmission mode and, given reception of a telegram of the monitoring unit that contains a switch-back instruction, outputs a second control signal for the first transmission mode.

The circuit arrangement is fashioned as an error locating means and/or in-service monitoring means for transmission links of communication transmission technology having at least one transmission section respectively arranged between two line terminal equipment and may potentially contain one or more intermediate locations. The monitoring unit is formed by the error locating means and/or in-service monitoring means and the processor units are allocated to at least one part of the line terminal equipment and/or to at least one part of the intermediate locations. The evaluation means can contain a microprocessor having a RAM as data store.

In the method, the query telegrams and reply telegrams, in particular, alternate with one another. Switching from the second transmission mode into the first transmission mode can be automatically triggered after a prescribed time or at every other correct call.

In the method, the change-over can respectively ensue on the basis of a control instruction or on the basis of telegrams in and of themselves.

BRIEF DESCRIPTION OF THE DRAWINGS

The invention shall be set forth in greater detail with reference to the exemplary embodiments shown in the figures.

The figures show equipment for in-service monitoring of communication transmission equipment, namely FIG. 1 having a fundamental digital signal line section;

FIG. 4 having a branch star network.

Figure 6:
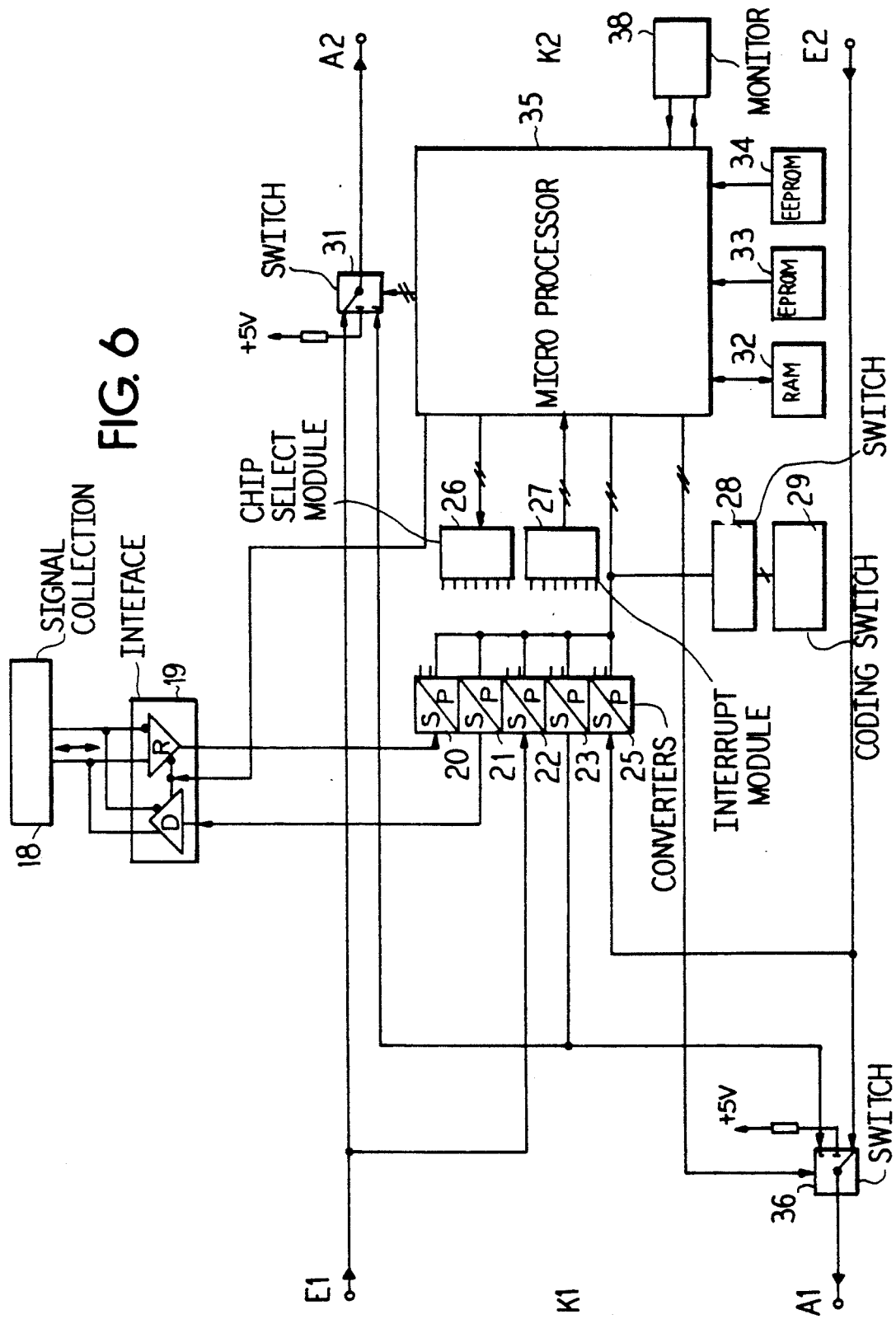

Further shown are:

FIG. 5 a block circuit diagram of a processor unit having a bus terminal;

FIG. 6 a processor unit constructed in conformity with FIG. 5 but without a bus terminal.

DESCRIPTION OF THE PREFERRED EMBODIMENT

Line terminal equipment, intermediate repeaters and light waveguides are the basic elements of the digital signal transmission link shown in FIG. 1 whose functionability and transmission properties are to be monitored with the assistance of devices of an equipment for in-service monitoring composed of the locating module 7, the personal computer 8 and the in-service monitoring processor units referred to below as processor units 6.

The locating module can be omitted when the processor units 6 are executed such that they can be connected as master or as slave. One processor unit 6 must then be connected as master and assume the jobs of the locating module and the other processor units must be designed as slaves.

The smallest unit of a digital signal transmission link is a fundamental digital signal line section, referred to below as line section 4. In the transmission equipment of FIG. 1, the line section is composed of two line terminal equipment 1 and of one or more intermediate repeaters 2 inserted into the link as needed.

A processor unit 6 that respectively receives the monitoring data from the main system to be monitored via an internal bus is inserted into every line terminal equipment 1 and into every intermediate repeater 2.

Figure 1:
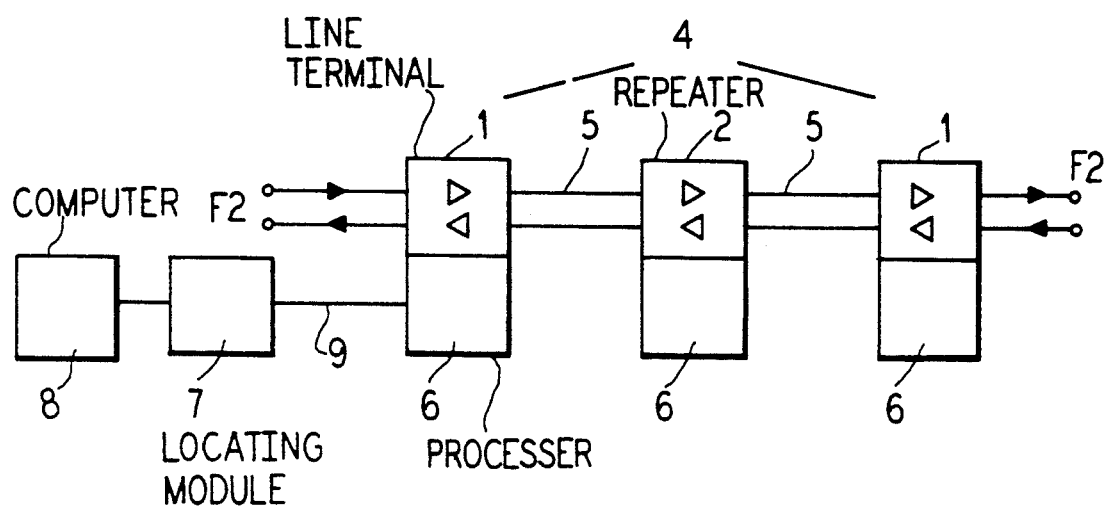
Figure 3:
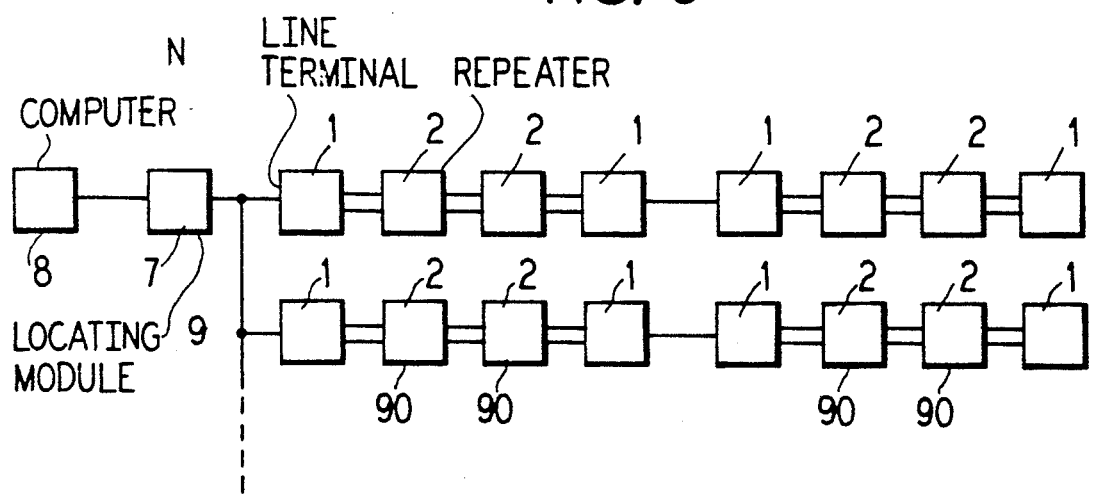
FIG. 3 having a star network containing a plurality of parallel lines.
Figure 2:
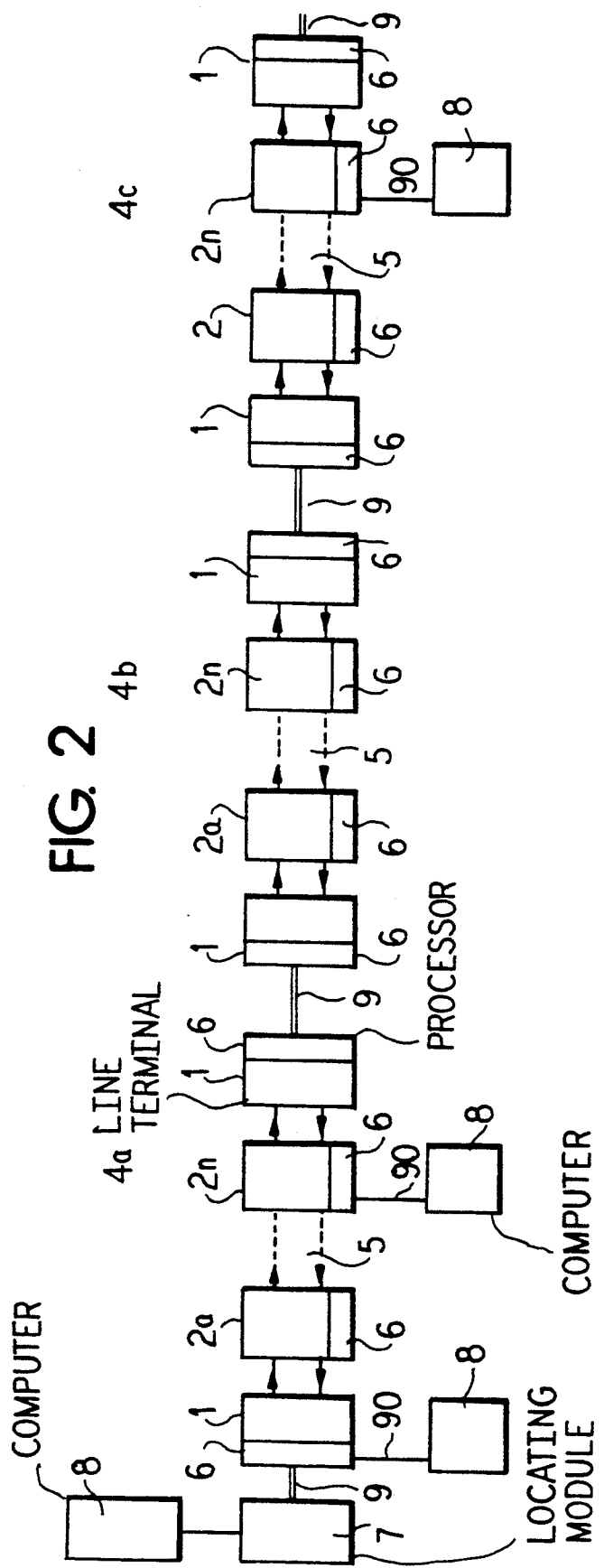
FIG. 2 having a line network composed of three fundamental digital signal line sections.

Dependent on the demands, the locating domain can be composed of the following structures:

of a line that, conforming to FIG. 1 or, respectively, FIG. 2, is composed of one or more line sections connected in chain;

conforming to FIG. 3, of a network having a plurality of parallel lines;

conforming to FIG. 4, of a star network provided with branchings.

Dependent upon the application, the terminal K3a having two unidirectional interfaces or the terminal K3 having one bidirectional interface is employed.

The data of the processor units 6 are respectively coupled out within a line section 4 via the terminals K1, K2 and are transmitted in an auxiliary channel that is preferably superimposed on the useful signal.

Within a line, the data of the processor units 6 are coupled in and out of the auxiliary channel from line terminal equipment 1 to line terminal equipment 1 via the four-wire terminals K1, K2 and maybe transmitted from a line section 4a to the next line section 4b via the terminals K3 or, respectively, K3a.

In the arrangements shown in FIG. 2, the line sections 4a . . . 4c are connected chained. The locating module 7 is connected to the processor unit 6 of the line terminal equipment 1 in one of the two local ends of the chain circuit. A personal computer 8 is connected to this locating module 7. Further personal computers 8 are directly connected to the processor unit 6 of the first line terminal equipment 1 and to two of the intermediate repeaters 2n.

Useful signals are transmitted from line terminal equipment 1 to line terminal equipment 1 within the line sections 4a . . . 4c. The data of the processor units 6 are transmitted within the line sections 4a . . . 4c via a respective auxiliary channel and are transmitted between the line sections 4a . . . 4c via a respective ISM bus (in-service monitoring bus) 9 having the interface RS 485 (terminal K3 of the processor unit).

All processor units 6 additional have a terminal 90, particularly having the interface RS 232 C, to which a personal computer 8 can be connected. This possibility has been utilized at a line terminal equipment and at two intermediate repeaters.

FIG. 3 shows two of a plurality of lines ending at the network node N (branching).

The processor units of the line terminal equipment 1 and the locating module 7 are connected to one another via the ISM bus 9 at the network node N.

According to FIG. 4, the locations A through G are connected to one another via a branched star network. A line section 4AB without intermediate repeater is provided between the locations A and B, two line sections 4BC1, 4BC2 each having an intermediate repeater 2 are provided between the locations B and C; a line section 4BD is provided between the location B and the location D; and a respective line section 4DF and 4GE is provided between the location D and F and the location D and G. The location E is also connected via a line section 4E to the intermediate repeater 2 of the line section 4BC2.

A respective personal computer 8 is connected to the processor unit of the line terminal equipment 1 at the locations A and C. The personal computer 8 can thereby optionally ensue [sic] at the ISM bus 9 with the interface RS 485 or at an additional terminal of the processor unit having the interface RS 232 C. In addition to the line terminal equipment 1 of the line sections ending thereat, the locating module 7 is additionally connected to the ISM bus 9 at the location D, this locating module 7 being provided with a means for polling control. The locating module 7 has an additional terminal 70 for the connection of a signal collecting means via which the monitoring data of the star network can be called from the locating module 7 by the signal collecting means.

Given a branch, the data of the processor units 6 are transmitted between the line terminal equipment 1 via the terminals K3 or, respectively, K3a and via a network node.

In the networks of FIGS. 1 through 4, a means for executive sequencing, particularly a locating module 7 and/or a personal computer 8 is connected to one of the network nodes or to one of the processor units. The locating module 7 or a personal computer 8 successively polls the individual processor units 6 via call-in telegram with their addresses, receives their monitoring data by reply telegram and evaluates the latter.

In the method for in-service monitoring on which the following description is based, the locating telegrams are asynchronously transmitted with a standard protocol conforming to IEC TC57. Other protocols such as CCITT X25 (HDLC) are also possible for the transmission. In the master function, the locating module interrogates the processor units of the entire network.

During normal operation, i.e. in the fault free condition, all telegrams in the individual equipment formed by line terminal equipment and intermediate repeaters are connected through from the input to the output without intermediate storing. A short query cycle for an extensive network is thus achieved. In each processor unit provided for the in-service monitoring in each and every line terminal equipment or, respectfully, intermediate repeater, the traversing telegrams, however, are investigated for errors and disturbances of the regular execution on the basis of monitoring. When a faulty telegram is recognized by the processor unit of a line terminal equipment or, respectively, intermediate repeater, then the processor of this equipment switches into protected mode for the appertaining direction after the end of this telegram.

A first modification of the method has the following execution:

Since no regeneration of the telegrams ensues, the error also occurs at all following devices. These thus likewise switch into protected mode. This means that all incoming telegrams are intermediately stored in the processor units from the first, disturbed regeneration section on, are investigated for errors and only error-free telegrams are through-connected to the output.

The following can thereby serve as error criteria:
parity via a character
check sum via the user data
matching of the two length particulars in the L-fields
matching of the length particular with the actual length
correct start and stop character
permanent transmission of formerly correct telegrams by a faulty transmitter
generating a break condition (continuous low) on the in-service monitoring channel
checking with cyclical protection code (cyclic redundancy check).

Every line terminal equipment or, respectively, every intermediate repeater that has switched into the protected mode sends a telegram in both directions that contains the identifier "protected mode". When a device is already in protected mode when it receives this telegram and when it has already transmitted its telegram that indicates switching into the protected mode, then it does not forward the incoming telegram.

The master, particularly a locating module, immediately switches to the search-callin cycle after receiving a telegram having the identifier "protected mode". In this operating mode, the master—when the device was situated in the protected mode successively calls the equipment (line terminal equipment or, respectfully, intermediate repeaters) proceeding from the locating module and deprotects them. In their reply telegrams, the individual equipment tell whether they were in the protected mode.

Two cases can be distinguished for identifying the error location.

When, beginning at the locating module up to a defined point of the link, all devices were in the protected mode, then the location of the error lies in the regeneration section following the device that was the last that was in the protected mode. An error is thus present in the return direction of the link.

When, beginning at the locating module, devices are in protected mode only after a certain point of the link, then the error location lies in the regeneration section preceding the device that was the first to be in protected mode. An error is thus present in the forward direction of the link.

The search-callin cycle is executed with the same speed as the ordinary callin cycle since the addressed devices are respectively deprotected beginning with the first device following the locating module and, thus, the intermediate storage of the telegrams is again eliminated. A critical advantage of the method lies therein that only correct telegrams are forwarded in the operating mode of "protected mode". Data collision, ambiguous or garbled telegrams can thus not occur even in the error case.

In a second modification of the method, the locating module 7—in the protected mode—successively calls the individual line terminal equipment and intermediate repeaters 2 in with their address (call telegram) and subsequently receives a reply telegram with the ISM (in-service monitoring) message contents.

In the error-free condition, all callin and reply telegrams arriving at a line terminal equipment or, respectively, intermediate repeater are through-connected to the output without intermediate storage in order to keep the time of a polling cycle as short as possible. The traversing telegrams, however, are monitored for errors and disturbances of the regular execution in the processor unit 6 of each and every line terminal equipment 1 or, respectively, intermediate repeater 2. When the processor unit 6 of a line terminal equipment 1 or, respectively, intermediate repeater 2 subsequently recognizes an error in one of the traversing telegrams, then the processor unit of this device as well as all processor units in the following devices switch into the transmission mode of "protected mode" for this direction. Beginning with the first disturbed regeneration section, this means that all incoming telegrams in this transmission direction are intermediately stored in the processor units, are checked for errors and that only error-free telegrams are through connected to the respective output.

The following, for example, are the error criteria:
parity and block check must be correct;
length of the telegram must match with the length particular in the L-field of the telegram header.

The transmission mode of "protected mode" can be activated and deactivated in every equipment on the basis of a control instruction from the locating module/personal computer.

The transmission mode of "protected mode" and the transmission direction pertaining thereto are reported to the polling locating module/personal computer in the reply telegram.

Due to the intermediate storage of the telegrams in the processor units of each and every line terminal equipment/intermediate repeater that is needed in the protected mode, a polling cycle in this mode lasts significantly longer than during normal operation.

The following execution is proposed in order to keep the time for a polling cycle optimally short even given disturbances:

After receiving the information that an equipment has switched into the "protected mode", the locating module immediately starts a new polling cycle. In this polling cycle, the locating module begins with the callin of the equipment that lies closest to it and, with a control instruction, switches this equipment back into the normal mode. Subsequently, the equipment lying therebehind is called and is likewise switched into normal operation. This procedure is continued until the last equipment of a line has been called in. What is achieved in this way is that—given callin of an equipment—all equipment lying between the locating module and the called equipment are switched into normal operation. The polling cycle with switching into normal operation thus lasts no longer than a polling cycle with equipment that are in normal operation.

Since, given a disturbance, all devices following the location of the disturbance (in transmission direction) switch into the "protected mode", the location of the disturbance can also be unambiguously identified.

Sporadically occurring errors in the ISM channel can therefore also be reliably located with this method.

When a call telegram is disturbed and, as a result thereof, does not contain the given instructions, no processor unit assembly sends a reply telegram. Given permanent faults, only the processor unit situated in front of the fault location send a reply telegram.

When a reply telegram is disturbed and therefore does not contain the given instructions, this is recognized by the locating module/personal computer. Given permanent faults, the locating module/personal computer receives correct reply telegrams only from processor units that are situated in front of the location of the fault.

The location of the fault can therefore also be identified given permanent faults.

The processor unit can be switched between two modes for the transmission of the telegrams.

1. Normal mode: All telegrams incoming at the interfaces are immediately forwarded to the next line equipment and, in parallel thereto, are checked by the microprocessor for their content.

2. Protected mode: All telegrams incoming at the interfaces are first checked by the microprocessor for their content before they are forwarded to the next line equipment.

The processor unit shown in FIG. 5 has an input E1 and output A1 for the connection of a first four-wire data channel for the transmission of telegrams, has an input E2 and output A2 for the connection of a second four-wire data channel and has a third input E3 and output A3 for the connection of a third four-wire data channel.

Each of three outputs A1, A2 and A3 can be optionally connected to the output of an exclusive-OR element 37, 30 or, respectively, 12 or to the output of a parallel-to-serial converter 23, being connectable thereto via a switch-over means 36, 31 or, respectively, 13 that is controllable by the microprocessor 35. This parallel-to-serial converter 23 has its parallel input connected to the port PO of the microprocessor 35. The switch-over means 36 is thereby controlled via the two-lead control line St5, the switch-over means 13 is controlled via the two-lead control line St3 and the switch-over means 31 is controlled via the two-lead control line St6, being all controlled by the microprocessor 35.

The exclusive-OR elements 12, 30 and 37 that respectively lead to an output of one of the three four-wire terminals operate the data incoming at the inputs of the two other four-wire terminals.

The serial-to-parallel converts 20, 22, 24 and 25 as well as the parallel-to-serial converters 21 and 23 are contained in UART modules or in HDLC modules. The serial-to-parallel or, respectively, parallel-to-serial converters 20 through 25 are connected via an 8-bit parallel bus to the port PO of the microprocessor 35 and are selected by the chip select module 26 connected to the microprocessor 35. On the basis of the interrupt module 27 that is likewise connected to the microprocessor 35, they interrupt the program of the microprocessor as needed.

The coding switch 29 with whose assistance the processor unit can be set to an address is also connected to the port PO of the microprocessor 35 via the switch 28.

The RAM 32 serving as data store, the EPROM 33 serving as program memory, the EEPROM 34 serving as non-volatile data store and the module 38 for self-monitoring are also connected to the microprocessor 35.

The output of the exclusive-OR element 12 is conducted to the one input of the OR element 15 via the means 14a for signal edge recognition and via the means 14b connected in chain therewith. Together with a control input of the means 14a and 14b, the other input of the OR element 15 is connected to the control line St2 coming from the microprocessor 35. The transmission-reception module 11 lies between the four-wire terminal pair E3, A3 and the bus terminal K3 for the connection of a bidirectional bus. The control input of this transmission and reception module 11 via which the transmitter D or the receiver R can be optionally activated is connected to the output of the OR element 15.

During normal operation, the telegrams are directly forwarded from the data input E1 or E3 to the output A2 via the exclusive-OR element 30 and via the switch 31. From input E2 or E3, the telegrams proceed to the output A1 via the exclusive-OR element 37 and via the switch 36.

The exclusive-OR element 12 or, respectively, 30 or, respectively, 37 sees to it that no data are transmitted when data simultaneously arrive at the inputs E1 and E2 or, respectively, E1 and E3 or, respectively, E2 and E3.

Since no data dare arrive simultaneously at the input E1, E2 and E3 given error-free operation, the exclusive-OR elements 12, 37 and 30 inhibit data only in case of error.

Data that arrive at the input E1 or E2 can also proceed via the exclusive-OR element 12 and the switch 13 to the transmitter D of the transmission-reception module 11 and can proceed from the latter to the bus terminal K3. To this end, the switch 13 must be situated in the illustrated, normal position and the transmitter D must be activated. This is the case when the means 14a recognizes a leading edge and the OR element 15 receives a corresponding control potential via the means 14b and-/or via the control line St2.

When, during normal operation, data are conducted via the exclusive-OR element 12 to the bus terminal K3, then these data are also supplied into the means 14a for signal edge recognition. When the means 14a for signal edge recognition recognizes the leading edge of the first bit of a telegram, then it starts the timer circuit 14b. This timer circuit outputs an output pulse that is independent of the bit sequence that arrives at the input of the means 14a for signal edge recognition. The output pulse proceeds via the OR element 15 to the transmission-reception module 11 and, thereat, immediately engages the driver module D and disengages the reception module R. Data that arrive at one of the inputs E1 or E2 of the processor unit are thus immediately forwarded to the bus terminal K3 by the recognition of a leading edge.

Simultaneously, the data are transmitted to the microprocessor 35 for processing. Data that arrive at the input E1 proceed to the microprocessor 35 via the serial-to-parallel converter 22; data from the input E2 proceed to the microprocessor 35 via the serial-to-parallel 25; and data from the input E3 proceed to the microprocessor 35 via the serial-to-parallel converter 24. The serial-to-parallel converters 22, 24 and 25 accept the data byte-by-byte and always output an interrupt pulse to the microprocessor 35 whenever they have loaded a byte in order to output it to the port PO of the microprocessor 35. When the microprocessor 35 finds that the data satisfy given demands, then it activates the control line St2. As a result thereof, the microprocessor 35 activates the driver module D of the interface module 11 via the OR element 15.

When, while evaluating a telegram, the microprocessor 35 finds that given demands were not satisfied, then it initiates the processor unit to switch into a protected mode. In the protected mode, the microprocessor 35 activates two of the three control lines St3, St5 and St6. Two of the three switches 13, 31 and 36 are therefore switched, so that all data that the parallel-to-serial converter 23 outputs proceed to two of the three outputs A1, A2, K3 from whose direction the telegram was not received.

The data incoming at the input E1 are processed in the serial-to-parallel converter 21; the data incoming at the input E2 are processed in the serial-to-parallel converter 25. The microprocessor thus recognizes the direction from which the data comes. In the protected mode, the control lines St6 and the control lines St5 are therefore activated such that the output A1 or A2 via which transmission is not carried out is applied to high potential via the switches 31 or 36 and via the pull-up resistor.

The signal collector 18 is connected to the microprocessor 35 via the interface module 19 and via the serial-to-parallel converter 20 and the parallel-to-serial converter 21. The signal collector 18 supplies the monitoring data of the monitored intermediate location and, as warranted, receives the control information contained in the callin telegram for forwarding to a signal collecting means (not shown). The processor 35 transmits the monitoring data of the monitored intermediate location in all three directions K1, K2 and K3 via the switch-over means 13, 31, 36 and via the outputs A1, A2, A3. When a plurality of terminals K3 are connected to one another via a bidirectional bus at a network node, then the following sequence derives for the engagement and disengagement of a bus driver:

In the quiescent condition, all drivers are inactive and have a high-impedance output. When data arrive at the terminal K1 or K2, the timer 14b is started by the signal edge of the start bit, this timer 14b activating the driver for at least two characters. The further holding and deactivation is then assumed by the microcomputer 35 to which the data were supplied parallel.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

We claim:

1. A method for controlling and/or monitoring, whereby at least one monitoring unit exchanges information with processor units that are connected to the monitoring unit via a common telegram transmission network and are provided with addresses, whereby polling telegrams of the monitoring unit and reply telegrams of the processor units are transmitted, comprising the steps of:

for at least one of the processor units;

receiving a telegram in at lest one transmission direction;

in a first transmission mode, of the associated processor unit, sending the telegram without intermediate storage;

in a second transmission mode of the associated processor unit, intermediately storing the telegram, check the telegram for errors and sending the telegram only if no errors are identified in the telegram; and immediately switching the associated processor unit from the first transmission mode to the second transmission mode when errors are identified in the telegrams as a result of checking he telegram for errors during the first transmission mode.

2. The method according to claim 1, wherein switching of the processor units from the second transmission mode to the first transmission mode is respectively initiated by a control instruction of the monitoring unit.

3. The method according to claim 1, wherein the processor units that have switched into the second transmission mode report the new mode in the reply telegram following the switching and report the appertaining transmission direction to the monitoring unit.

4. The method according to claim 3, wherein the monitoring unit, following a message that a processor unit has switched into the second transmission mode, cyclically calls the processor units beginning with the processor unit that lies closest to the monitoring unit and sends a control instruction that switches the processor units that are in the second transmission mode from the second transmission mode into the first transmission mode.

5. The method according to claim 1, wherein the monitoring unit is as an error locating means and exchanges information with processor units that are allocated to locations of a communication transmission equipment.

6. The method according to claim 1, wherein the monitoring unit is an in-service monitoring means and exchanges information with processor units that are allocated to locations of a communication transmission equipment.

* * * * *